United States Patent [19]
Rooney

[11] Patent Number: 6,021,829
[45] Date of Patent: Feb. 8, 2000

[54] ALL-TERRAIN-VEHICLE TIRE

[75] Inventor: Timothy Michael Rooney, Munroe Falls, Ohio

[73] Assignee: The Goodyear Tire & Rubber Company, Akron, Ohio

[21] Appl. No.: 09/101,052

[22] PCT Filed: Jul. 18, 1996

[86] PCT No.: PCT/US96/12964

§ 371 Date: Jun. 25, 1998

§ 102(e) Date: Jun. 25, 1998

[87] PCT Pub. No.: WO98/03356

PCT Pub. Date: Jan. 29, 1998

[51] Int. Cl.[7] .................. B60C 11/11; B60C 107/02; B60C 121/00
[52] U.S. Cl. ........................................ 152/209.12
[58] Field of Search .................. 152/209.12, 209.28

[56] References Cited

U.S. PATENT DOCUMENTS

| | | | |
|---|---|---|---|
| D. 308,038 | 5/1990 | Guidry | D12/146 |
| D. 342,927 | 1/1994 | Thomas | D12/136 |
| D. 389,441 | 1/1998 | Rooney | D12/136 |
| 4,480,672 | 11/1984 | Marshall et al. | 152/209 |
| 4,711,283 | 12/1987 | Bonko et al. | 152/209 B |
| 5,259,429 | 11/1993 | Harms | 152/209 |
| 5,318,086 | 6/1994 | Narumi et al. | 152/209.12 |
| 5,375,640 | 12/1994 | Harms | 152/209.12 |
| 5,411,067 | 5/1995 | Beeghly et al. | 152/209 |
| 5,901,765 | 5/1999 | Bonko | 152/209 B |

FOREIGN PATENT DOCUMENTS 423059  4/1991  European Pat. Off. .

OTHER PUBLICATIONS

Flyer from Sand Tires Unlimited, (no date).
Wheel Action Magazine, p. 32, Jun. 1995 issue.

*Primary Examiner*—Steven D. Maki
*Attorney, Agent, or Firm*—David L King

[57] ABSTRACT

An all terrain vehicle tire 10 has a tread 12 specifically designed for mud traction. The tread 12 has four circumferentially repeating rows 1,2,3,4 of elongated lugs 40,42, two shoulder rows 1,2 and two central rows 3,4. Adjacent the axially outer ends 45 of the lugs 42 of the central row 3,4 is a shoulder block 44. The tread 12 has soil discharge channels 60 extending axially between the lugs 40,42. Each channel 60 is open in two locations 61,62 to one or more axially aligned and circumferentially adjacent soil discharge channel 60. Preferably each location 61,62 represents about 20% of the axial arc width of a tread half. These locations 61,62 permit mud to move freely from a forward channel 60 towards a rear channel 60 and enhances tread cleaning as the tire 10 rotates.

5 Claims, 6 Drawing Sheets

ALL-TERRAIN-VEHICLE TIRE

TECHNICAL FIELD

This invention relates to a pneumatic all terrain vehicle tire.

BACKGROUND ART

All terrain vehicles are relatively light weight with a relatively low center of gravity. Early three wheel versions had knobby tires having small square block elements and a relatively shallow tread depth.

Later versions of "Quad runners" or 4 wheel type ATV's were developed and have been more widely accepted due to their improved stability. Horsepower increases and improvements in both vehicle suspension and chassis has resulted in vehicles capable of relatively high speed and much greater load carrying capacity.

The tires used on these vehicles are operated at very low pressures in the 0.7 bar (10 psi) or less range. The tires are very wide with relatively large air chambers which assist in absorbing shock and vibration. The tires generally have nominal rim diameters of 36 cm (14 inches) or less and overall diameters of 66 cm (26 inches) or less.

Often the rear tires are of a slightly larger size than the more lightly loaded front tires.

In aggressive off-road applications the tires must have a very open tread pattern that employs elongated lugs which provide effective straightline or drawbar traction to enable the vehicle to climb hilly and rough terrain, as shown in U.S. Design Pat. No. 308,038. Additionally, the tread must provide excellent lateral traction for vehicle stability during turning maneuvers as is disclosed in U.S. Pat. No. 5,259,429.

The tire disclosed in that patent employs a repeating pattern of long, intermediate length and short lugs arranged to provide improved traction. The arrangement of these lugs is such that each lug wraps completely over the tread shoulder portion. The lugs are also circumferentially relatively closely spaced such that numerous lugs are in the footprint of the tire at any one time. The tire made according to this prior art invention is considered one of the best mud tires in its class according to its manufacturer.

DISCLOSURE OF THE INVENTION

SUMMARY

An all terrain vehicle tire 10 has a nominal rim diameter of 36 cm (14 inches) or less, a carcass 30 having a pair of annular beads 22 and one or more cord reinforced plies 38 wrapped about and extending between the two beads. The tire 10 further has a tread 12 disposed radially outward of the carcass 30. The tread 12 has an inner tread 13, a plurality of short blocks 44 and a plurality of elongated lugs 40,42 extending radially outward from the inner tread 13.

The lugs 40,42 are arranged into four circumferentially repeating rows 1,2,3,4. A first and second shoulder row 1,2 extends laterally inward from a shoulder portion of the tread 12. A third and fourth central row 3,4 extends laterally from a central portion of the tread 12 toward one of the tread shoulder portions. The lugs 42 of the central third and fourth rows 3,4 each have an axially outer end 45 axially spaced axially inward of and circumferentially aligned with an adjacent block 44 located in a shoulder portion of the tread 12. Each lug 42 of the third central row 3 is circumferentially interposed between a pair of the shoulder lugs 40 of the first row 1. Similarly, each lug 42 of the fourth central row 4 is interposed between a pair of the shoulder lugs 40 of the second row 2. The lugs 40,42 of the first and third rows 1,3 are similarly but oppositely inclined relative to the lugs 40,42 of the second and fourth rows 2,4.

The volumetric space above the inner tread 13 between the circumferentially adjacent lugs 40,42 of the first, second, third and fourth rows 1,2,3,4 and the shoulder blocks 44 form soil discharge channels 60 extending from the central portion of the tread 12 axially outwardly to a tread shoulder.

Each soil discharge channel 60 is opened to one circumferentially adjacent soil discharge channel 60 via an opening at an axially inner location 61 and is opened to another circumferentially adjacent soil discharge channel 60 via an opening at an axially outer location 62. The openings at the axially inner location 61 and the openings at the axially outer location 62 alternate in the circumferential direction. The axial width of each opening at each axially inner location 61 and each axially outer location 62 are about 20% of the axial arc width of one tread half. The opening at the axially inner location 61 is between an axially inner end of a shoulder lug 40 and an axially inner end of a central lug 42.

Whereas, the opening at the axially outer location 62 is between a central lug 42 and a block 44. The openings at each of the axially inner and axially outer locations 61, 62 are between circumferentially extending and parallel edges of the lugs 40, 42 and the lugs 42 and blocks 44 respectively.

Preferably each lug 40,42 of the first, second, third and fourth row has an enlarged circumferentially extending lug head 43 located at an axially inner end 47 of the lug 40,42, more preferably the lug heads 43 of the third and fourth row 3,4 are axially aligned. Additionally, the enlarged lug heads 43 of the lugs 40 of the first row are substantially aligned axially with the axially outer end 45 of the circumferentially adjacent lug 42 of the third row. Similarly situated are the lugs 40 of the second row relative to the lugs 42 of the fourth row. This means that both the enlarged lug head 43 of the first and second row are axially inward of the axially outer location 62 between the lug end 45 and the aligned block 44.

Definitions. "All Terrain Vehicle (ATV)" is any motorized off-highway vehicle 50 inches (1270 mm) or less in overall width, with an unladen dry weight of 600 lbs (275 kg) or less, designed to travel on four low pressure tires, having a seat designed to be straddled by the operator and handlebars for steering control, and intended for use by a single operator and no passenger. Width and weight shall be exclusive of accessories and optional equipment. ATV's are subdivided into four categories as follows:

Category G (General Use Model) ATV: An ATV intended for general recreational and utility use;

Category S (Sport Model) ATV: An ATV intended for recreational use by experienced operators only;

Category U (Utility Model) ATV: An ATV intended primarily for utility use.

Category Y (Youth Model) ATV: An ATV intended for recreational off-road use under adult supervision by operators under age 16. Youth model ATV's can further be categorized as follows:

Category Y-6 ATV: A Category Y-6 ATV is a youth model ATV which is intended for use by children age 6 and older.

Category Y-12 ATV: A Category Y-12 ATV is a youth model ATV which is intended for use by children age 12 and older.

"Aspect Ratio" means the ratio of its section height to its section width.

"Axial" and "axially" means the lines or directions that are parallel to the axis of rotation of the tire.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about a 25–65° angle with respect to the equatorial plane of the tire, the ply cords running at opposite angles in alternate layers.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Equatorial Plane (EP)" means the plane perpendicular to the tire's axis of rotation and passing through the center of its tread.

"Inner" means toward the inside of the tire and "outer" means toward its exterior.

"Outer" means toward the tire's exterior.

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Radial" and "radially " mean directions radially toward or away from the axis of rotation of the tire.

"Radial Ply Tire" means a belted or circumferentially-restricted pneumatic tire in which the ply cords which extend from bead to bead are laid at cord angles between 65° and 90° with respect to the equatorial plane of the tire.

"Section Height" (SH) means the radial distance from the nominal rim diameter to the outer diameter of the tire at its equatorial plane.

"Section Width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Sidewall" means that portion of a tire between the tread and the bead.

"Tread" means a molded rubber component which when, bonded to a tire casing, includes that portion of the tire that comes into contact with the road when the tire is normally inflated and under normal load.

"Tread Width or Tread Arc Width" means the arc length of the tread surface in the axial direction, that is, in a plane parallel to the axis of rotation of the tire.

DETAILED DESCRIPTION OF THE INVENTION

Figure 1:
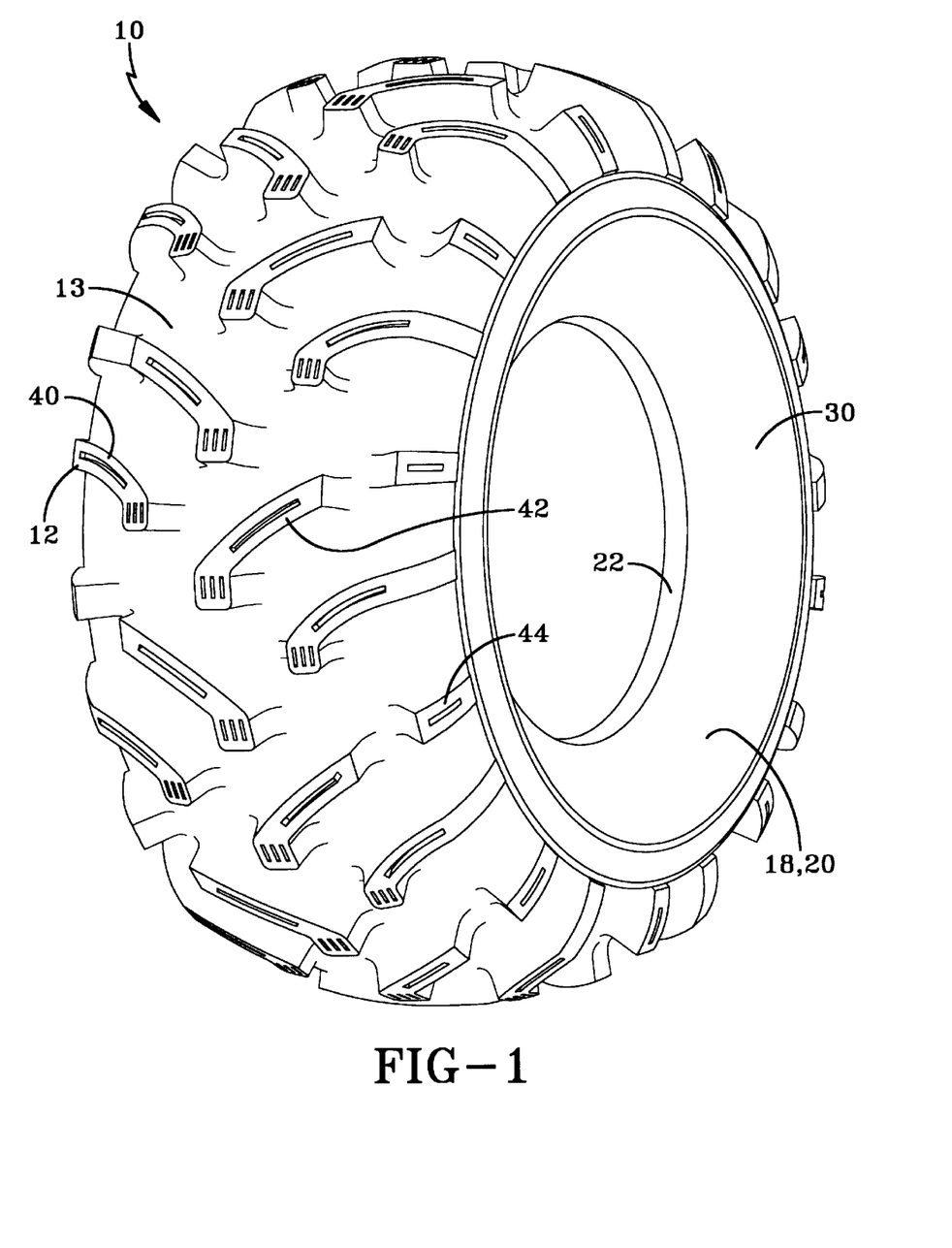
FIG. 1 is a perspective view of the preferred tire according to the invention.

With reference to FIG. 1 the preferred tire 10 according to the present invention is illustrated. The tire 10 has a nominal rim diameter of 36 cm (14 inches) or less; a carcass 30 a tread 12 disposed radially outward of the carcass.

The reference numerals as depicted in the drawings are the same as those referred to in the specification. For purposes of this application, the various embodiments illustrated in FIGS. 1–6 each use the same reference numerals for similar components.

The tread 12 has an inner tread 13 and a plurality of short blocks 44 and a plurality of elongated lugs 40,42 extending radially outward of the inner tread 13.

Figure 3:
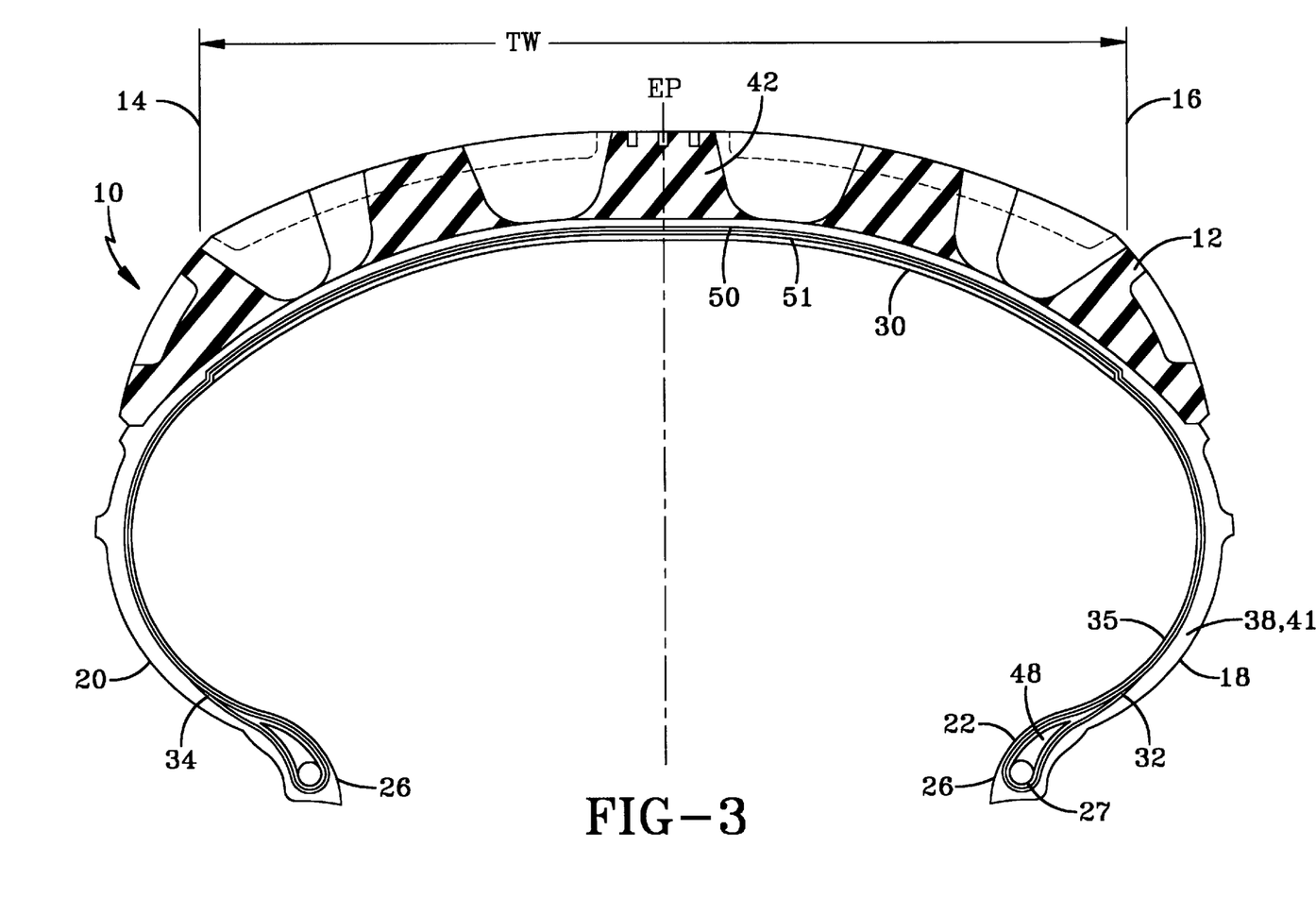
FIG. 3 is a cross-sectional view of the tire taken along lines 3—3 of FIG. 2.

Referring to FIG. 3 a cross-sectional view of the preferred tire 10 is shown.

The tire 10 according to the present invention is an ATV tire. The tire 10 is provided with a ground-engaging tread portion 12 which terminates in the shoulder portions at the lateral edges 14,16 of the tread 12. Sidewall portion 18,20 extends from tread lateral edges 14,16 respectively and terminates in a pair of bead regions 22 each having an annular inextensible bead core 26 respectively. The tire 10 is further provided with a carcass 30 which has a reinforcing ply structure 38 which extends from bead region 22 through sidewall portion 18, tread portion 12, sidewall portion 20 to bead region 22. The turnup ends 32,34 of ply structure 38 are preferably wrapped about bead cores 26 respectively. The tire 10 may include a conventional innerliner 35 forming the inner peripheral surface of the tire 10, if the tire is to be of the tubeless type. One pair of tread reinforcing belt or breaker structures 36 may optionally be placed circumferentially about the radially outer surface of reinforcing ply structure 38 beneath tread portion 12. In the particular embodiment illustrated, breaker structures 36 each comprises two cut breaker plies 50,51 and the cords of breaker plies 50,51 are oriented at an angle of about 35° with respect to the midcircumferential centerplane of the tire.

The cords of breaker ply 50 are disposed in an opposite direction to the midcircumferential centerplane and from that of the cords of breaker ply 51. However, the belt or breaker structures 36 if used in the ATV tire may comprise any number of belt or breaker plies of any desired configuration and the cords may be disposed at any desired angle. Belt or breaker structures 36 provide lateral stiffness across the belt width so as to help minimize lifting of the tread from the road surface during operation of the tire as well as providing puncture resistance. In the embodiment illustrated, this can be accomplished by making the cords of belt or breaker plies 50,51 of nylon or similar synthetic material.

It must be appreciated that the employment of a belt or breaker structure can have detrimental effects on ride and handling and therefore in many applications the use of such features may be undesirable for a particular ATV vehicle. Furthermore, these belt or breaker structures may be desirable on the front tires or the rear tires but not both the front and rear tires. One of ordinary skill in the tire art can easily appreciate when such components should be employed and when they should be avoided.

The tire illustrated in FIG. 3 shows the carcass 30 which has at least one reinforcing ply structure 38. The reinforcing ply structure 38 has at least one ply layer of cords 41 for a radial ply tire, the cords 41 being oriented at an angle in the range of 65° to 90° relative to the equatorial plane and the structure 38 for a bias tire has at least two ply layers of cords 41, the cords of each adjacent layer being equal but oppositely oriented at an angle of 25° to 65° with respect to the equatorial plane of the tire.

Figure 2:
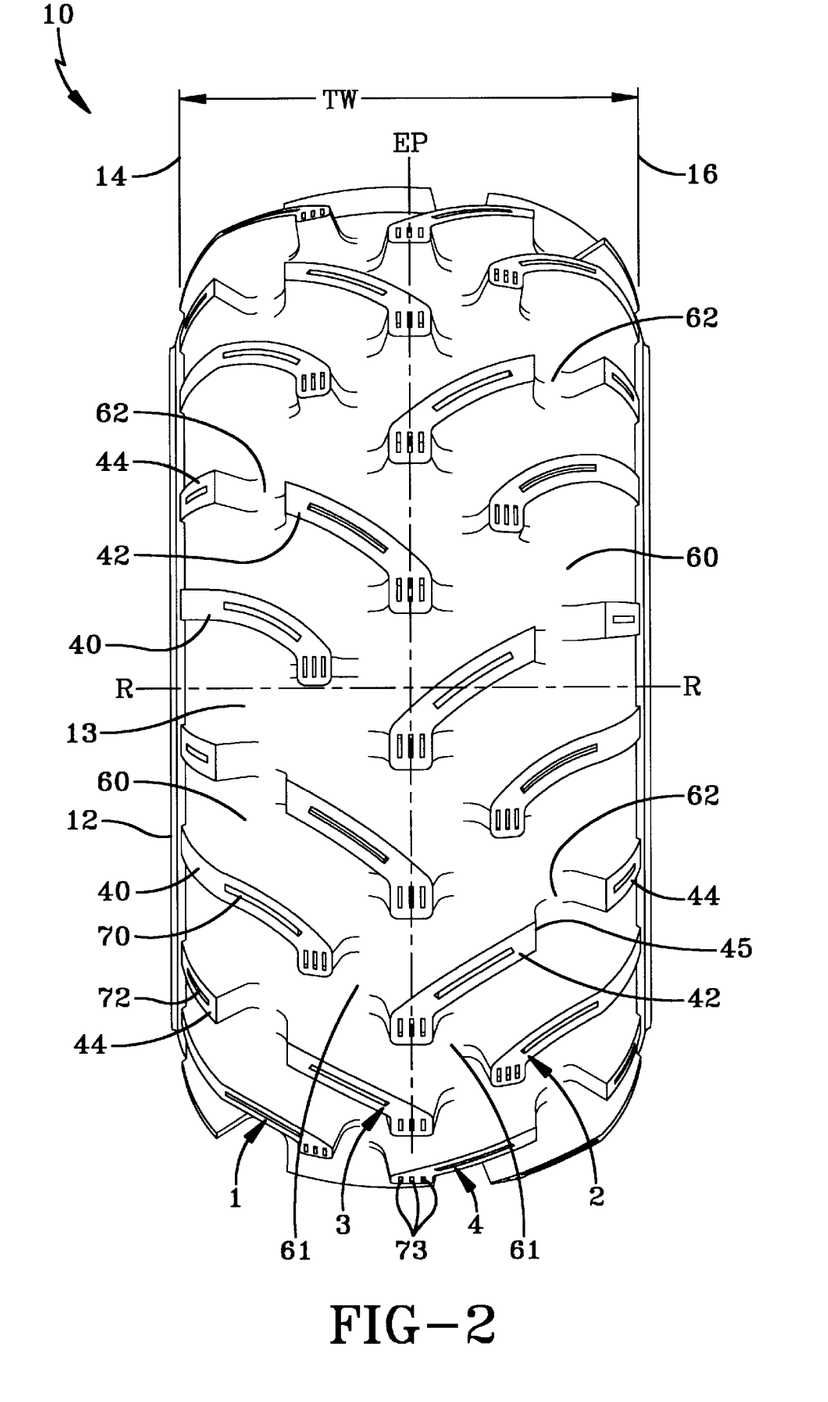
FIG. 2 is a plan view of the tire of FIG. 1.
Figure 4:
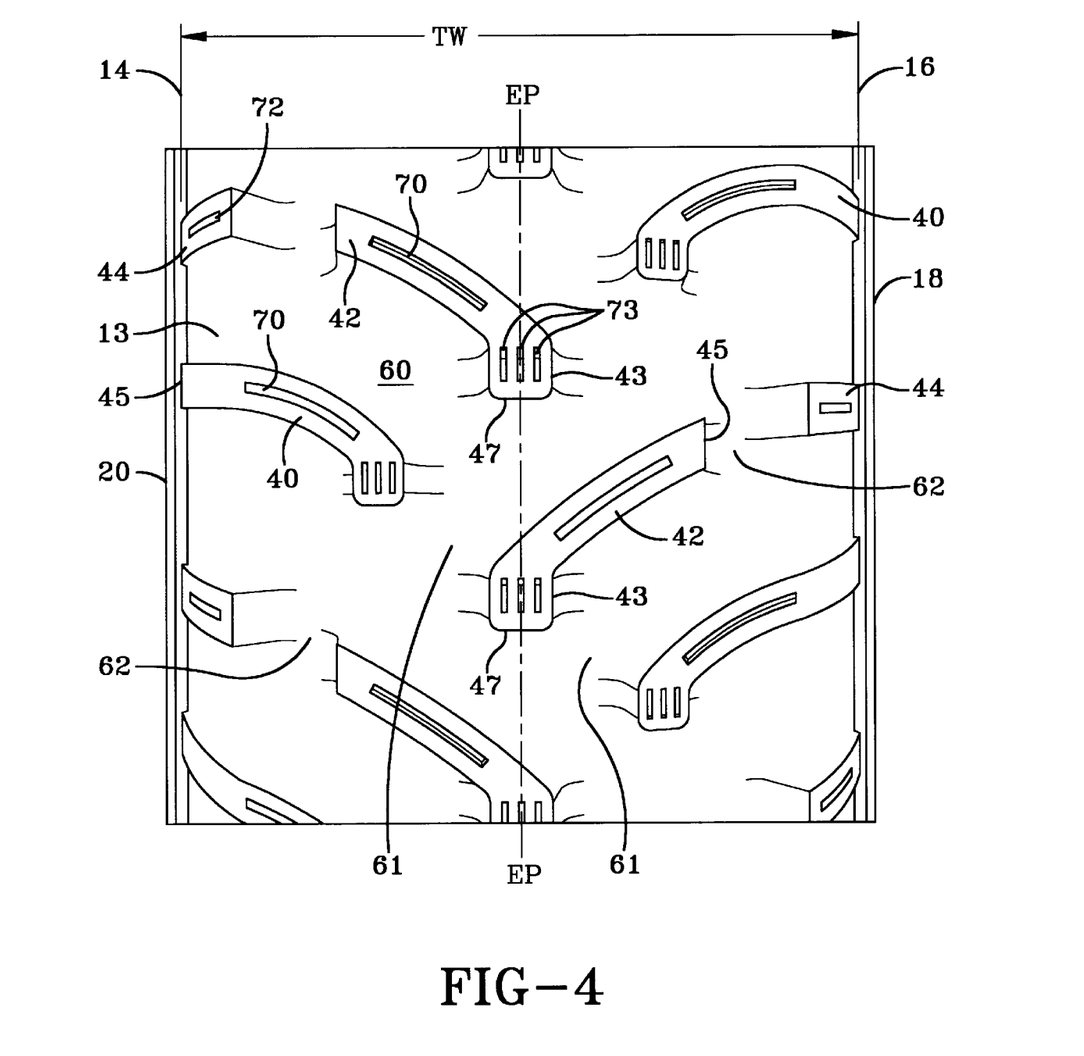
FIG. 4 is an enlarged fragmentary view of the tire of FIG. 1.

Referring to FIGS. 2 and 4 a plan view of the tire 10 is illustrated and an enlarged fragmentary portion of the tread 12 is shown.

The lateral edges 14,16 are defined as planes perpendicular to the tire axis of rotation R and intersecting the axially outermost portions of the lug or blocks in the shoulder regions. The distance between the lateral edges defines the tread arc width and the tread width. The distance half way between the lateral edges is the equatorial centerplane EP of the tire 10. The tread 12 has elongated lugs 40,42 and short blocks 44 extending radially outward from the inner tread 13.

The lugs 40,42 are arranged into four circumferentially repeating rows 1,2,3,4. A first and second shoulder row 1,2 extends laterally inward from a shoulder portion of the tread 12. A third and fourth central row 3,4 extends laterally from a central portion of the tread 12 toward one of the tread shoulder portions. The lugs 42 of the central third and fourth rows 3,4 each have an axially outer end 45 axially spaced axially inward of and circumferentially aligned with an adjacent block 44 located in a shoulder portion of the tread. Each lug 42 of the third central row 3 is circumferentially interposed between a pair of the shoulder lugs 40 of the first row 1. Similarly, each lug 42 of the fourth central row 4 is interposed between a pair of the shoulder lugs 40 of the second row 2. The lugs 40,42 of the first and third rows are similarly but oppositely inclined relative to the lugs 40,42 of the second and fourth rows.

Figure 6:
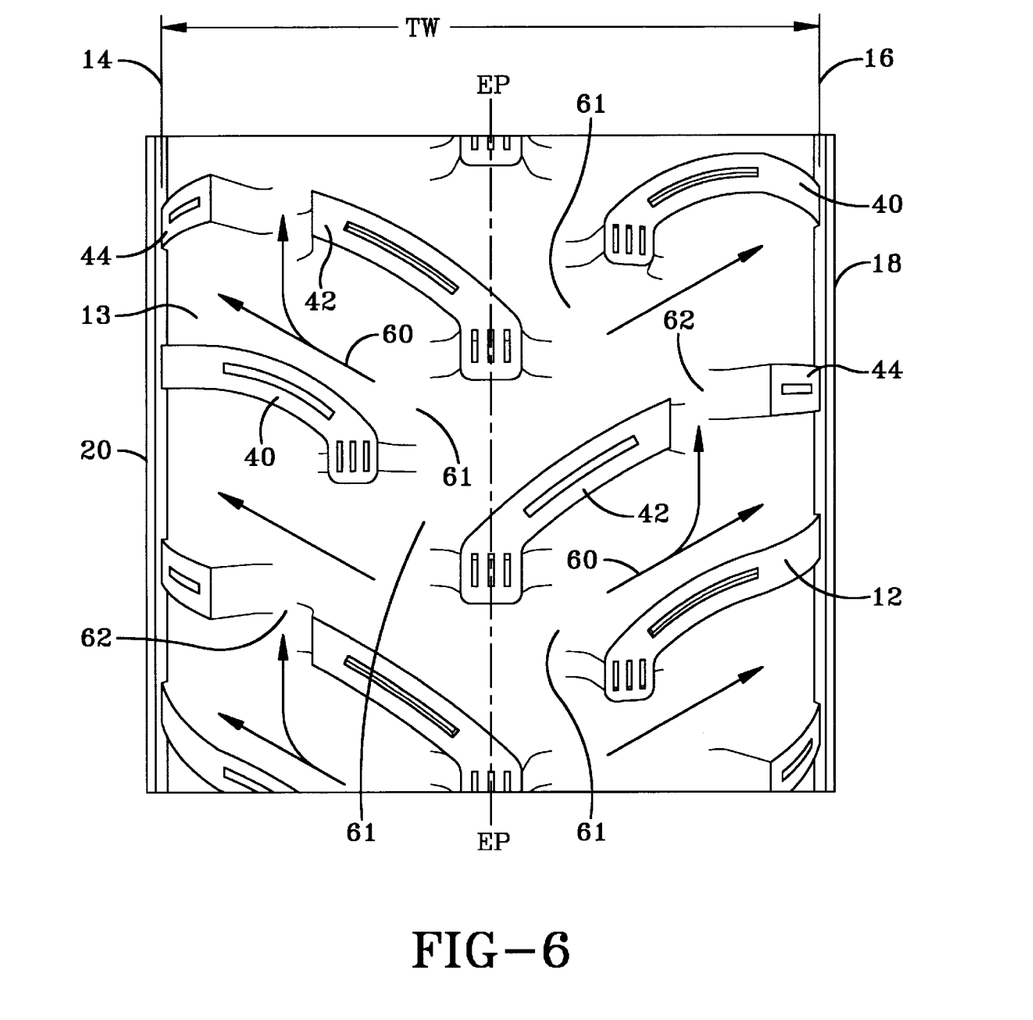
FIG. 6 is a soil discharge flow pattern of a footprint of the tire of FIG. 1.

As shown in FIG. 6, volumetric space above the inner tread 13 between the circumferentially adjacent lugs 40,42 of the first, second, third and fourth rows 1,2,3,4 and the shoulder blocks 45 form soil discharge channels 60 extending from the central portion of the tread 13 axially outwardly to a tread shoulder. Each channel 60 is open in two locations 61,62 to one or more axially aligned and circumferentially adjacent soil discharge channel 60. The two locations 61,62 are an axially inner location 61 in the central location and an axially outer portion lying between a lug 42 of the third or fourth row and a block 45 aligned with the respective lug 42 of the third or fourth row. Each of these locations 61,62 represent an open space of a length equal to about 20% of the axial arc width of one-half of the tread as measured between the equatorial plane and a tread edge.

Preferably each lug 40,42 of the first, second, third and fourth row 1,2,3,4 has an enlarged circumferentially extending lug head 43 located at an axially inner end 47 of the lug 40,42, more preferably the lug heads 43 of the third and fourth rows 3,4 are axially aligned and lying on the equatorial plane. Additionally, the enlarged lug heads 43 of the lugs 40 of the first row 1 are substantially aligned axially with the axially outer end 45 of the circumferentially adjacent lug 42 of the third row 3. Similarly situated are the lugs 40 of the second row 2 relative to the lugs 42 of the fourth row 4. This means that the enlarged lug head 43 of the lugs 40 of the first and second row are axially inward of the axially outer location 62 between the lug end 45 of the lug 42 and the aligned block 44.

The lugs 40,42 and blocks 44 extend from the inner tread 13 a radial distance D of about 2.0 cm or more, preferably about 2.5 cm. This deep nonskid tread 12 is superior in traction in wet or sloppy soil conditions. The channels 60 are arranged such that as the tire 10 rotates and the lugs 40,42 enter the footprint or ground contacting portion at least two of lugs 40 and two of lugs 42 or three soil discharge channels 60 are engaging the soil on one or both tread halves. The soil or mud is quickly expelled either axially over the shoulder or circumferentially laterally through the locations 61,62. Furthermore, the mud cannot pack around these deep lugs 40,42 due to the unique lug spacing and the circumferential openings at locations 61,62 between the channels 60 which actually tend to pull the mud out of the tread pattern as the tire 10 rotates.

An important feature of the tread 12 of the current invention is the circumferentially extending enlarged lug heads 43. These features enhance the ride of the tire 10 when the ground is firm by insuring that there is a sufficient lug contact with the road to prevent these tall lugs 40,42 from squirming as they enter or leave the tire's footprint or contact patch as the tire rotates. Additionally, as can further be observed from the drawings the lugs 40,42 are arranged such that at least two lugs on the tread are in contact along a one inch wide axial band at any circumferential location of the tread. That is, if one draws a one inch wide band axially across the tread the band will intersect at least two lugs, preferably the band width is substantially less than one inch.

These features make the driver feel that he has a large amount of tread in contact with the road surface when in fact only a very small percentage of the contact patch is in road contact.

This tread according to the invention has less than 25% of the tread contacting a paved surface, preferably less than 20%, as shown 17%.

Unlike farm tires which travel at speeds of less than 25 miles per hour on roads. This ATV tire must be capable of speeds close to 50 mph. At such speeds the lugs must work in concert to prevent harsh vibrations from being created which could on unstable vehicle. This tread pattern when operated a low pressure can sufficiently dampen these vibration is to permit the tire to be operated at high speed. This is made possible by the shape and the orientation of the lugs as shown. Each lug 40,42 has a somewhat circumferential as well as lateral inclination which enhances the tire's ride performance.

Figure 5:
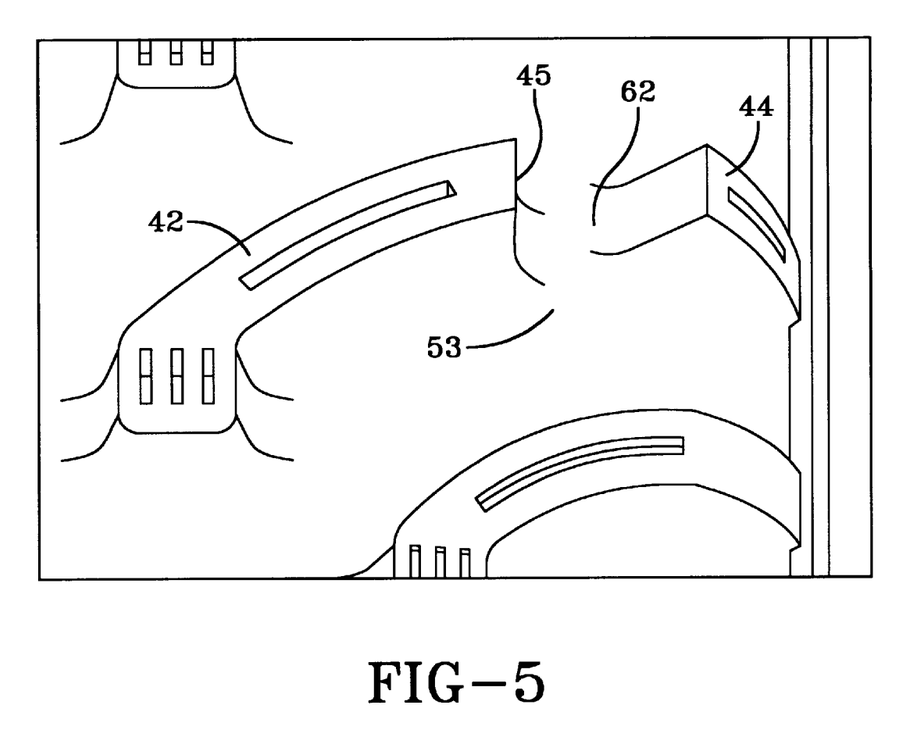
FIG. 5 is an alternative lug and block construction for the tire of FIG. 1.

As further illustrated in FIG. 5 the locations 62 do not have to extend full depth as shown in the preferred embodiment tire of FIGS. 1, 2, 3, 4 and 6. The space between the lug 42 and the short block 44 can be bridged by a tie bar 53 of a reduced depth. It is believed important that this connection 53, between the lug 42 and the blocks 44, should leave an opening having a depth of at least 50% of the lug depth D for the soil channel flow characteristics to be maintained. Lesser amounts of opening are believed to be too restrictive in terms of flow and therefore less desirable.

As can be appreciated from the above description a novel tread for superior off-road traction in ATV tires has been disclosed. Those skilled in the art will appreciate that subtle variations and modifications can be made without departing from the inventive concept. One such feature is the use of shallow grooves 70,72,73 within each of the lugs 40,42 and blocks 44. These groove openings 70,72,73 of reduced depth provide additional traction edges. These features must be shallow to prevent the elongated lugs 40,42 from becoming too flexible and thereby adversely influencing ride stability and tread wear.

What is claimed is:

1. An all-terrain vehicle tire having a nominal rim diameter of 36 cm (14 inches) or less, a carcass having a pair of annular beads and one or more cord reinforced plies wrapped about and extending between the two beads, a tread radially outward of the carcass, the tread having an inner tread a plurality of short blocks and a plurality of elongated lugs extending radially outward from the inner tread, the all-terrain vehicle tire characterized by:

the lugs being arranged into four circumferentially repeating rows, a first and second shoulder row extending laterally inward from a shoulder portion of the tread, a third and fourth central row extending laterally from a central portion of the tread toward one of the tread shoulder portions; wherein the lugs of the central third and fourth rows each have an axially outer end axially spaced axially inward of and circumferentially aligned with an adjacent block located in a shoulder portion of the tread, each lug of the third central row being circumferentially interposed between a pair of the shoulder lugs of the first row, each lug of the fourth central row being interposed between a pair of the shoulder lugs of the second row, the lugs of the first and third row are similarly but oppositely inclined relative to the lugs of the second and fourth rows, the volumetric space above the inner tread and between the circumferentially adjacent lugs of the first, second, third, and fourth central rows and the shoulder blocks form soil discharge channels extending from the central portion of the tread axially outwardly to a tread shoulder; wherein each soil discharge channel is opened to one circumferentially adjacent soil discharge channel via an opening at an axially inner location and is opened to another circumferentially adjacent soil discharge channel via an opening at an axially outer location, the openings at the axially inner location and the axially outer location alternating in the circumferential direction, the axial width of each opening at each axially inner location and each axially outer location being about 20% of the axial arc width of one tread half, the opening at the axially inner location being between an axially inner end of a shoulder lug and an axially inner end of a central lug, the opening at the axially outer location being between a central lug and a block, each of the openings at each of the axially inner and axially outer locations being between circumferentially extending parallel edges of the lugs or the lugs and blocks, respectively.

2. The all terrain vehicle tire (10) of claim 1 wherein each lug (40, 42) of the first, second, third and fourth row (1, 2, 3, 4) has an enlarged circumferentially extending lug head (43) located at an axially inner end (47) of the lug (40, 42).

3. The all terrain vehicle tire (10) of claim 2 wherein the enlarged lug heads (43) of the lugs (40, 42) of the third and fourth row (3, 4) are axially aligned.

4. The all terrain tire (10) of claim 2 wherein the enlarged lug heads (43) of the lugs (40) of the first row (1) are substantially aligned axially with the axially outer end (45) of the circumferentially adjacent lug (42) of the third row (3).

5. The all terrain tire (10) of claim 2 wherein the enlarged lug heads (43) of the lugs (40) of the second row (2) are substantially aligned axially with the axially outer end (45) of the circumferentially adjacent lug (42) of the fourth row (4).

* * * * *